US008027905B2

(12) United States Patent
Zhang et al.

(10) Patent No.: US 8,027,905 B2
(45) Date of Patent: Sep. 27, 2011

(54) GENERATING ADJUSTED BIDS OF ENTITIES ACCORDING TO A NEW EXTERNAL BID

(75) Inventors: Alex X. Zhang, San Jose, CA (US); Kemal Guler, San Jose, CA (US); Fereydoon F. Safai, Los Altos Hills, CA (US); Shailendra Jain, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1126 days.

(21) Appl. No.: 11/517,705

(22) Filed: Sep. 8, 2006

(65) Prior Publication Data

US 2008/0065559 A1  Mar. 13, 2008

(51) Int. Cl.
*G06Q 40/00* (2006.01)
(52) U.S. Cl. ....................................................... 705/37
(58) Field of Classification Search .................... 705/37, 705/35, 59; 345/543
See application file for complete search history.

(56) References Cited

U.S. PATENT DOCUMENTS

| 5,243,515 | A  | * | 9/1993  | Lee ................................ 705/37 |
| 2001/0021923 | A1 |   | 9/2001  | Atkinson et al. |
| 2002/0128953 | A1 | * | 9/2002  | Quallen et al. .................. 705/37 |
| 2003/0225683 | A1 | * | 12/2003 | Hill et al. ........................ 705/37 |
| 2004/0093583 | A1 |   | 5/2004  | McAnaney et al. |
| 2005/0131797 | A1 |   | 6/2005  | Ananthanarayanan et al. |

OTHER PUBLICATIONS

Flexible Decision-Making in Sequential Auctions. Gangshu Cai. Operations Research and Computer Science. 2005.*
Computation and Robustness in Sealed-Bid Auctions. Theodore Turocy. Field of Managerial Economics and Decision Sciences. Dec. 2001.*
Simultaneous Multiobject Auctions. Balazs Szentes. Boston University Graduate Schoold of Arts and Sciences. 2002.*

* cited by examiner

*Primary Examiner* — Alexander Kalinowski
*Assistant Examiner* — John O Preston

(57) ABSTRACT

An initial external bid of an enterprise that is based on initial component bids of plural entities is received by a tool. The tool receives margin values representing margins acceptable to the entities. A new external bid is received that is different from the initial bid, and adjusted component bids of the plural entities are generated by the tool according to the new external bid and the margins of the entities.

21 Claims, 2 Drawing Sheets

GENERATING ADJUSTED BIDS OF ENTITIES ACCORDING TO A NEW EXTERNAL BID

BACKGROUND

Businesses that supply services or goods are often asked by customers to provide competitive bids, such as in an auction bidding context or in a traditional request for price/request for quote (RFP/RFQ) context. From the perspective of the customer, a single bid is submitted by each particular business, which bid may be adjusted as several rounds of bidding occur. Although a single external bid is presented by a particular business to the customer in each round of bidding, it is noted that a business may have multiple business entities that provide corresponding component bids that make up the external bid. As the external bid is adjusted, the component bids of the individual business entities are impacted.

Traditionally, a "bottom-up" technique is used in which a business prepares its external bid based on summing component bids from the various business entities of the business. Thus, if the external bid is lowered, then each business entity of the enterprise has to prepare a new component bid. This bottom-up approach is relatively slow as the approach involves mostly manual work. Therefore, the conventional "bottom-up" approach cannot be used in a fast-paced on-line bidding environment in which a particular business may have to revise its external bids (and the component bids associated with the various business entities of the business) within a relatively short amount of time (hours or even minutes).

Also, because of the manual nature of using conventional approaches of adjusting component bids based on a revised external bid, the adjustments are usually error-prone. Errors can result from mistakes in data entry and in calculations. In addition, in some cases, adjustments of component bids due to a lowered external bid may cause component bids for at least some of the business entities to be too low.

BRIEF DESCRIPTION OF THE DRAWINGS

Some embodiments of the invention are described with respect to the following figures.

DETAILED DESCRIPTION

Figure 1:
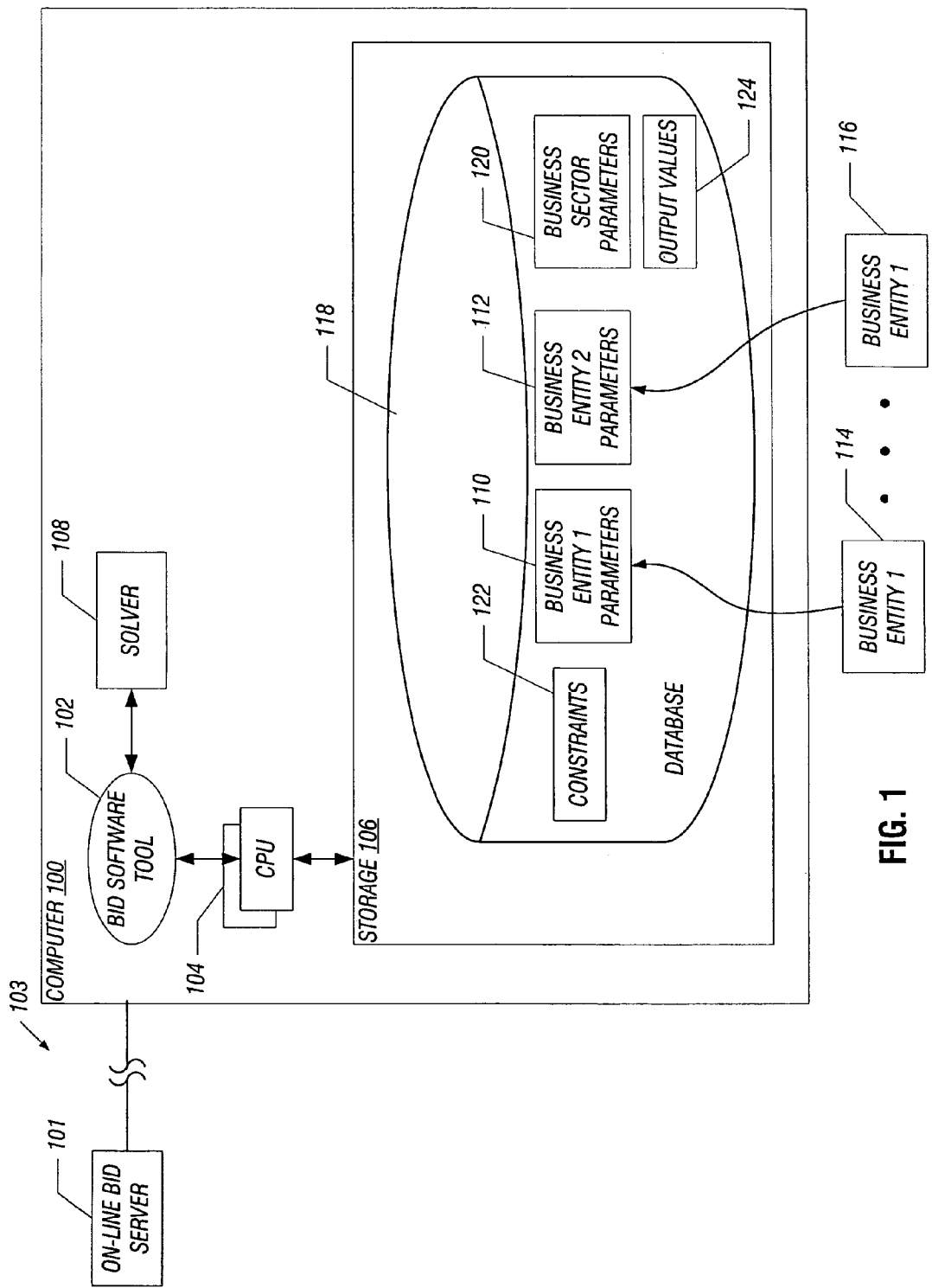
FIG. 1 is a block diagram of an example system that incorporates a bid software tool, in accordance with an embodiment.

In accordance with some embodiments of the invention, a bid software tool is provided for performing a "top-down" process of adjusting bid amounts that takes into account initial margins and minimum margins of multiple business entities associated with an enterprise. As an external bid presented by the enterprise to a customer (or supplier) is revised, the component bids of the business entities associated with the enterprise are adjusted by the bid software tool, where the adjustment of the component bids takes into account the initial and minimum margins of the business entities. The initial margins allow the bid software tool to calculate cost (or price) information for each business entity, and the minimum margins allow the bid software tool to ensure that revised bid components do not fall below margins expected by respective business entities (minimum margins). The recalculation of component bids associated with the business entities can be performed relatively quickly, which is useful in bid environments, such as on-line bidding environments, where enterprises are expected to quickly adjust their bids (sometimes in a matter of minutes or seconds).

An enterprise refers to any organization that is capable of submitting bids to an external entity (customer or supplier). Examples of an enterprise include businesses, educational facilities, government agencies, and so forth. A business entity associated with the enterprise refers to a particular unit, division, or other segment of the enterprise (or to a third party vendor of the enterprise). For example, in the business context, an enterprise may have a printer division that sells printers, a computer division that sells computers, and so forth. Each business entity can in turn have multiple sub-entities, which in turn may have lower sub-entities. In other words, an enterprise may have a hierarchical organizational structure made up of numerous entities at different levels in the hierarchy. In this discussion, the term "business entity" refers to any business entity in that hierarchy. Also, although reference is made to a "business entity," note that the term applies equally to units or divisions of educational facilities, government agencies, and so forth. More simply, the term "entity" of an enterprise may be interchangeably used with the term "business entity." Also, the term "entity" or "business entity" is intended to cover either an entity within the enterprise or an entity outside the enterprise (such as a third-party vendor of goods or services).

A bid amount presented by an enterprise to a customer or a supplier is referred to as an external bid amount. In one scenario, the external bid amount can be provided by the enterprise to a customer to which the enterprise wishes to provide goods and/or services. In this scenario, the enterprise may be competing with other enterprises for the business of the customer in a bidding environment.

In another scenario, the external bid amount can be provided by the enterprise to a supplier that is supplying goods and/or services to the enterprise. The enterprise can be submitting the external bid amount to the supplier for a group of several goods and/or services.

A bid amount can be a bid price, a bid cost, or some other value that is used by the customer (or supplier) to select from among competitor enterprises (or to otherwise determine whether or not the customer or supplier is willing to work with the enterprise). In the context of bidding to a customer, a bid amount can refer to a price (as an example) that the enterprise wants to charge the customer for goods and/or services provided by the enterprise to the customer. In the context of bidding to a supplier, a bid amount can refer to a price (as an example) that the enterprise is willing to pay the supplier for goods and/or services. A component bid amount refers to a bid amount provided by a business entity associated with the enterprise, where an aggregate (e.g., sum) of the component bid amounts make up the external bid amount. A "margin" can refer to a margin percentage that is based on dividing profit by revenue. Alternatively, "margin" can refer to a margin amount, such as a monetary amount that reflects the particular profit of the business entity.

In the context of bidding to a customer, the margin of a business entity is based on the revenue derived from charging a sale price (the bid amount) to the customer. In the context of bidding to a supplier, the margin of a business entity is based on the price paid by the business entity to the supplier.

In accordance with some embodiments, the recalculation of component bids associated with business entities of an enterprise due to a revised external bid is based on a constrained mathematical optimization model that guarantees that minimum margins of the business entities will be honored and that the allocation would be fair according to a predefined rule. Fairness is defined by use of an objective function that can be agreed upon among the business entities of the enterprise.

In the ensuing discussion, reference is made to bids to customers and to entities within an enterprise. It is noted, however, that the same or similar techniques can be applied to bids to suppliers and to entities that are outside of an enterprise.

As depicted in FIG. 1, a bid software tool 102 according to some embodiments is executable in a computer 100. The term "software tool" refers to any collection of software routines and associated functions, libraries, and so forth for performing particular tasks. The computer 100 includes a central processing unit (CPU) 104 (or multiple CPUs) on which the bid software tool 102 is executable. The CPU 104 is coupled to storage 106, which storage can include one or more storage devices, including volatile memory devices and/or persistent storage devices, such as hard disk drives, optical disk drives, and so forth. The storage 106 contains various information that is used by the bid software tool 102 to perform adjustment of component bid amounts (component bids of business entities) in accordance with some embodiments. In the embodiment of FIG. 1, the bid software tool 102 is able to invoke a solver 108 for recalculating component bid amounts associated with business entities of an enterprise. The solver 108 can be an off-the-shelf product, such as the Microsoft EXCEL® solver, CPLEX software from ILOG, Inc., and MPL modeling software from Maximal Software, Inc., as examples. Alternatively, the solver 108 can be provided as part of the bid software tool 102.

The bid software tool 102 uses a mathematical optimization approach to solve the problem of recalculating component bid amounts of corresponding business entities when an external bid amount is changed. The mathematical optimization approach uses a constrained optimization model that honors the minimum margins specified by corresponding business entities. Generally, the constrained optimization model specifies an objective and one or more constraints that are to be satisfied. The objective defines a goal to be achieved by the constrained optimization model, which goal relates to the selection of the component bids in response to a revised external bid. The constraints of the constrained optimization model define limitations on the values that can be produced for the component bids. One such constraint is the minimum margin (percentage or monetary amount) of the business entity, which minimum margin refers to the lowest margin expected by the business entity. Note that the minimum margin can be a negative value (which means that the business entity is willing to accept a loss). Other constraints are described below.

The constrained optimization model used by the bid software tool 102 receives various parameters 110, 112 from corresponding business entities 114, 116. Although only two business entities 114, 116 are depicted in FIG. 1, it is noted that more than two business entities can be associated with a particular enterprise. The business entity parameters 110, 112 are stored in a database (or other type of repository) 118 that is contained in the storage 106. The blocks 114, 116 representing the business entities refer to servers associated with the business entities that are able to communicate over a network (e.g., local area network, wide area network, Internet, etc.) with the computer 100.

The computer 100 can also communicate, over a data network 103, with an on-line bid server 101 associated with a customer. The on-line bid server enables the enterprise associated with the computer 100 to submit external bids to the customer (which external bids can be revised in different rounds of an on-line bid session). Examples of on-line bidding include on-line auctions, on-line requests for quote (RFQ) or requests for price (RFP), and other bidding techniques.

In some embodiments, the database 118 can also store business sector parameters 120 (in addition to the business entity parameters 110, 112), where a business sector is considered a higher level entity of an enterprise. For example, an enterprise can have a printer sector, a personal computer sector, and so forth, where each sector includes further business entities. For example, the printer sector can have a first business entity associated with monochrome laser printers, and a second business entity associated with color inkjet printers. In the embodiment depicted in FIG. 1, it is assumed that two hierarchical levels are provided in the enterprise, where the enterprise includes a first hierarchical level made up of sectors, and a second, lower hierarchical level made up of business entities within each sector. In other implementations, an enterprise can be considered to have only one level of business entities; alternatively, an enterprise can have more than two hierarchical levels of business entities.

Based on the business entity parameters 110, 112, and the business sector parameters 120, the bid software tool 102 is able to compute various constraints 122 that are stored in the database 118. These constraints 122 are used by the constrained mathematical model (executed by the bid software tool 102) to solve the problem of recalculating component bid amounts of corresponding business entities in response to a change in the external bid amount.

In the following discussion, it is assumed that there are n business entities (business entity i where i=1, 2, . . . , n). It is also assumed that there are K sectors of the business entities, represented by sector k, where k=1, 2, . . . , K. The n business entities are divided among the K sectors.

The following additional parameters are defined, including s(k), which represents the set of business entities within sector k; R(i), which represents the initial component bid amount (or revenue) of business entity i; m0(i), which is the initial margin percentage of business entity i; m(i), which is the minimum margin percentage of business entity i, where $m(i) \leq m0(i)$; m(k) which represents the minimum margin percentage of sector k; and B, which represents a new external bid amount, which can be lower than the initial bid amount. Note that the initial bid amount is equal to a simple sum (or other aggregate) of the initial component bid amounts R(i), i=1, 2, . . . , n.

As noted above, the component bid amount R(i) of a business entity i is also the revenue of the business entity. The minimum margin percentage m(i) represents the percentage of profit based on the revenue R(i).

The parameters s(k) and m(k) are part of the business sector parameters 120, while the parameters R(i), m0(i), and m(i) are part of the business entity parameters, 110, 112. As noted above, the minimum margin percentage of some business entities can be negative, which means that these business entities are willing to accept a loss up to a certain amount. Instead of using margin percentages, margin monetary amounts (e.g., dollar amounts) can be specified instead to represent margins acceptable to business entities in monetary amounts.

When a new external bid amount (usually a lower bid amount) is provided by an enterprise, that means that the component bid amounts associated with corresponding business entities of the enterprise have to be adjusted. To enhance fairness among the business entities and to provide that minimum margins specified by business entities are not violated, an objective function for the constrained optimization model is defined as follows:

$$\text{Minimize } Z = \sum_{i=1}^{n} R(i) \cdot \left( \frac{X(i)}{R(i)} - r \right)^2, \quad \text{(Eq. 1)}$$

where X(i) represents the component bid amount (unknown at this point) for business entity i that is to be recalculated due to the change in the external bid amount, and r represents a ratio that is equal to the new external bid amount (B) divided by the initial bid amount (which is the sum of the initial component bid amounts R(i) of corresponding business entities), or $$r \equiv B \Big/ \sum_{i=1}^{n} R(i), \; 0 < r < 1. \quad \text{(Eq. 2)}$$

Note that r represents a proportional allocation that can be applied to proportionally adjust all component bids if minimum margins were not considered; in other words, the component bid amounts of corresponding business entities can be adjusted proportionally according to r. For example, if the new external bid (B) divided by the initial external bid is 90% (an example value of r), then a proportional allocation would involve multiplying 90% by the initial component bid amounts R(i) of the respective business entities to provide adjusted component bid amounts X(i). However, although such a proportional allocation may seem fair from one perspective, it may not be fair to a particular business entity if the proportional allocation causes the component bid amount of the particular business entity to violate the minimum margin of the particular business entity. According to some embodiments, further constraints are added that take into account the minimum margins of business entities and the minimum margins of particular sectors to ensure that these minimum margins are not violated.

Eq. 1 effectively minimizes the deviation from the proportional allocation while attempting to satisfy the constraints (discussed below) that the minimum margins of the business entities and minimum margins of the sectors should not be violated. Since the deviation from the proportional allocation can be on either side of r (over or under r), Eq. 1 takes the square of the deviation. In a different implementation, Eq. 1 can be rewritten to take the absolute value (rather than the square) of the deviation. In Eq. 1, the squared deviation is multiplied by the initial revenue R(i) to reflect different weights or sizes of the different business entities. Without multiplying by the initial revenue, then the deviation of adjusted component bid amounts from r would all be treated the same.

From the parameters m0(i) and R(i), the cost of each business entity i can be calculated as follows:

$$C(i) = [1 - m0(i)]R(i), \quad \text{(Eq. 3)}$$

where C(i) represents the cost of business entity i. The cost values C(i), i=1 to n, are used to determine whether minimum margins for the business entities would be violated for corresponding R(i) component bid amounts.

The objective function expressed by Eq. 1 above is one measure of fairness that may have been agreed to among business entities. The value Z can be interpreted as the total amount of revenue that is mis-allocated; in other words, the total amount of revenue that deviates from a "perfect allocation," which perfect allocation refers to allocation that is based strictly on the ratio r. The Z value is a non-negative number—the lower the Z value, the closer the allocation to a proportional allocation. A perfect allocation occurs when Z=0, which is achieved when all allocated component bid amounts are the same fraction (r) of their initial bid amounts (in other words, the initial component bid amounts have been recalculated strictly based on the ratio r).

The objective function of Eq. 1 thus states that is desirable to achieve a recalculation of the component bid amounts that is as close as possible to a recalculation that is based strictly on the ratio r, while taking into account other constraints.

The first constraint (C1) is that the allocated component bid amounts X(i) (or adjusted component bid amounts) should add up to the new external bid exactly, as follows:

$$X(1) + X(2) + \ldots + X(n) = B. \quad \text{(C1)}$$

The second constraint (C2) is that the minimum margins, m(i), specified by the business entities should be honored. Constraint C2 is defined as follows:

$$\frac{X(i) - C(i)}{X(i)} \geq m(i), \text{ for } i = 1, 2, \ldots, n. \quad \text{(C2)}$$

Using cost value C(i)=[1−m0(i)] R(i) and expressed in a linear inequality, the constraint C2 can be rewritten as constraint C2' as follows:

$$X(i) \geq \frac{1 - m0(i)}{1 - m(i)} R(i), \text{ for } i = 1, 2, \ldots, n. \quad \text{(C2')}$$

In constraint C2', the minimum margins m(i) at the business entities level translate to minimum allocated component bid amounts at the business entity level. The fraction $$\frac{1 - m0(i)}{1 - m(i)}$$

is a value between 0 and 1 (because initial margins are greater than or equal to minimum margins, m0(i)≧m(i)), and expresses the minimum allocated component bid amount, X(i) as a fraction of the initial component bid amount R(i). Constraint C2' effectively provides that the adjusted component bid amount X(i) for business entity i is some fraction of the initial component bid amount R(i), where the fraction is based on the initial and minimum margins M0(i) and m(i).

The third constraint (C3) expresses the minimum margins at the sector level:

$$\frac{\sum_{i \in s(k)} [X(i) - C(i)]}{\sum_{i \in s(k)} X(i)} \geq m(k), \text{ for } k = 1, 2, \ldots, K. \quad \text{(C3)}$$

Constraint C3 provides that the adjusted component bid amounts, X(i), of business entities within a particular sector s(k), should not cause the minimum margin of the particular sector m(k) to be violated. The above is equivalent to the linear inequality below:

$$\sum_{i \in s(k)} [X(i) - C(i)] \geq m(k) \cdot \sum_{i \in s(k)} X(i), \text{ for } k = 1, 2, \ldots, K. \quad (C3')$$

Or:

$$\sum_{i \in s(k)} X(i) \geq \frac{1 - m0(k)}{1 - m(k)} \sum_{i \in s(k)} R(i), \text{ for } k = 1, 2, \ldots, K. \quad (C3'')$$

Again, the fraction $$\frac{1 - m0(k)}{1 - m(k)}$$

is a value between 0 and 1 (because initial margins are greater than or equal to minimum margins, $m0(k) \geq m(k)$), and expresses the minimum allocated revenue as a fraction of the initial revenue. Constraint C3'' effectively provides that the aggregation (e.g., sum) of the adjusted component bid amounts of business entities in a sector is a fraction of the aggregation (e.g., sum) of the initial component bid amounts, where the fraction is based on the initial and minimum margins of each sector.

The final constraint, C4, is that each participating business entity should not receive a negative allocation (otherwise, no business entity would participate in the bid); in other words, the adjusted component bid amount X(i) should be a positive value:

$$X(i) \geq 0, i = 1, 2, \ldots, n. \quad (C4)$$

The constraint set defined by constraints C1, C2', and C3'' forms a feasible region for allocation of the component bid amounts, X(i), where a feasible allocation is defined as follows:

(Feasibility 1) (Eq. 4)

$$B \geq \sum_{i=1}^{n} \frac{1 - m0(i)}{1 - m(i)} R(i).$$

The right hand side of the feasibility allocation of Eq. 4 of the above inequality defines a minimum bid or a "walk-away" price. In other words, the new external bid to be submitted by the enterprise should be greater than or equal to the sum of the fractions $$\frac{1 - m0(i)}{1 - m(i)}$$

of the initial component bid amounts R(i), for i=1 to n.

The resulting constrained optimization model defined by the objective function of Eq. 1 and the constraints C1, C2', and C3'' is a quadratic problem with linear constraints. There are n continuous position variables X(i), one equality constraint C1, and n inequality constraints C3''. Constraint C2' can be converted into simple lower bounds on variables X(i) (in other words, constraint C2' can be represented as specifying minimum values for X(i)). This quadratic problem can be solved by using various off-the-shelf solvers, such as a Microsoft EXCEL® built-in solver, or other solvers mentioned above. The solver will then produce an optimal solution for the values of X(i), which represent adjusted component bids of corresponding business entities.

Alternatively, it is possible to apply the mathematical optimization approach to allocate margin dollars (rather than margin percentages). The definition of r is changed. Previously, r was defined as $$r \equiv B \Big/ \sum_{i=1}^{n} R(i), 0 < r < 1.$$

In an alternative embodiment, r is defined as the ratio of the new margin dollar (bid amount less total cost) to the old margin dollar (sum of initial margins multiplied by the initial component bid amounts), or $$r = \frac{B - \sum_{i=1}^{n} C(i)}{\sum_{i=1}^{n} m0(i) \cdot R(i)}$$

$$= \frac{B - \sum_{i=1}^{n} [1 - m0(i)] \cdot R(i)}{\sum_{i=1}^{n} m0(i) \cdot R(i)}.$$

With the same decision variables X(i), the allocated component bid amount for business entity i is defined by the following objective function:

$$\text{Minimize } Z = \sum_{i=1}^{n} m0(i) \cdot R(i) \cdot \left( \frac{X(i) - [1 - m0(i)] \cdot R(i)}{m0(i) \cdot R(i)} - r \right)^2. \quad \text{(Eq. 5)}$$

This objective function of Eq. 5 is similar to the objective function of Eq. 1, except that the value Z that is to be minimized in Eq. 5 is based on margin dollars rather than component bid amounts. The constraints for this optimization model would be the same as constraints C1, C2'', C3'', and C4.

Figure 2:
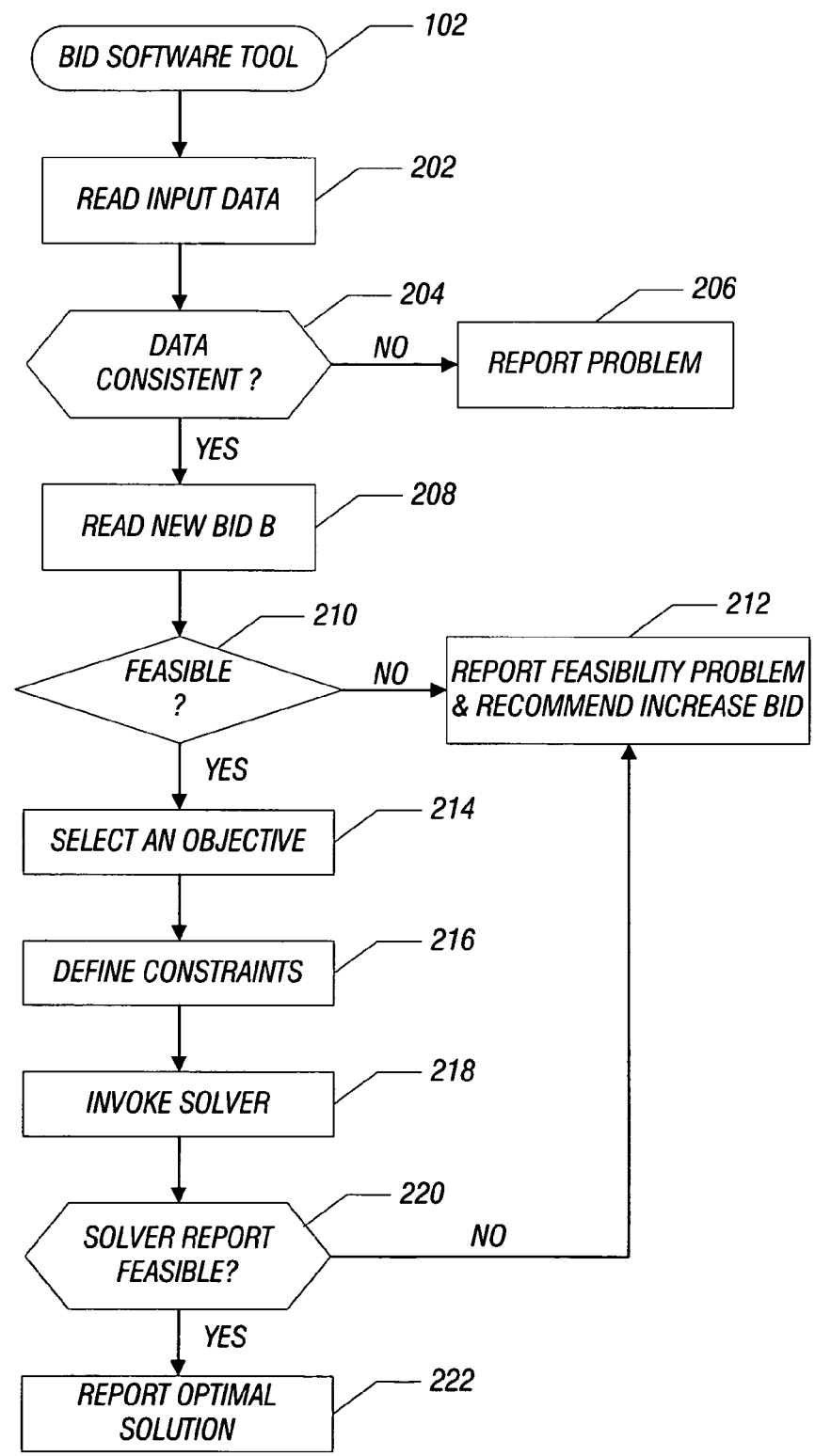
FIG. 2 is a flow diagram of a process performed by the bid software tool of FIG. 1, in accordance with an embodiment.

FIG. 2 illustrates a process performed by the bid software tool 102 according to some embodiments. The bid software tool 102 initially reads (at 202) the business entity parameters 110, 112, and business sector parameters 120. Next, the business software tool 102 checks (at 204) the input parameters (110, 112, 120) for data consistency. The checks performed by the bid software tool 102 include the following:

- Is $m(i) \leq m0(i)$ for each i=1, 2, ..., n (to check that each minimum margin is less than each corresponding initial margin)?
- Is $m(k) \leq m0(k)$ for each k=1, 2, ..., K (to check that each sector minimum margin is less than each sector initial margin)?
- Is $R(i) \geq 0$ for each i=1, 2, ..., n (to check that each initial component bid is non-negative)?

If data consistency is not present, then a problem is reported (at 206) and the process terminates. However, if the input parameters are consistent, then a new external bid B is read (at 208) by the bid software tool 102. This new external bid can be entered by a user into the bid software tool 102, for example, or the new external bid can be automatically generated by the bid software tool 102 according to some criteria (e.g., select a new external bid that is some amount less than the lowest bid of a competitor). The bid software tool 102 then checks (at 210) the feasibility of the new external bid; in other words, the bid software tool 102 checks to determine if the new external bid B satisfies $$B \geq \sum_{i=1}^{n} \frac{1-m0(i)}{1-m(i)} R(i)$$

(which is Eq. 4). If not (which means that the new external bid is too low), then a feasibility problem is reported (at 212), and an output can be provided to recommend that the external bid be increased.

However, if the new external bid B is feasible, then the bid software tool 102 selects (at 214) an objective (such as one of the objective functions defined above in Eqs. 1 and 5). The bid software tool 102 also further formulates (at 216) the constrained optimization model by defining the constraints C1, C2', C3", and C4.

Next, the solver 108 is invoked (at 218) to solve for the values X(i), which are the new component bid amounts. The bid software tool 102 determines (at 220) if the solver's output is feasible—in other words, the bid software tool 102 checks to see if the solver 108 indicated that the output the solver produced satisfies the constraints. If not, then the bid software tool 102 reports (at 212) a feasibility problem and recommends that the external bid B be increased. However, if the solver 108 indicates that the output is feasible, then the bid software tool 102 provides (at 222) the X(i) values as the optimal solution and reports that the recalculated X(i) values are feasible in light of the constraints.

In the above discussion, a reference time frame was not discussed. However, it is possible that a project under bid may last several years. In this case, the external bid provided by an enterprise can be divided into individual external bids for multiple distinct years, where each external bid associated with each year is treated independently. For example, if the net present value of an initial external bid is a certain amount, then the new external bid is divided by the net present value of the initial external bid, with this ratio applied to the initial external bids in corresponding years. For example, the independent initial bids for years 1, 2, 3, and 4 can include $\{IB_1, IB_2, IB_3, \text{ and } IB_4\}$, where $IB_x$ represents the initial external bids for years 1, 2, 3, and 4. The initial external bid amounts $IB_1$, $IB_2$, $IB_3$, and $IB_4$ are summed to provide a total initial external bid $IB_{TOTAL}$. The net prevent value of the $IB_{TOTAL}$ is then calculated, and the new total external bid B is divided by the net present value of $IB_{TOTAL}$ to calculate a ratio. This ratio is then multiplied by $\{IB_1, IB_2, IB_3, \text{ and } IB_4\}$ to derive $\{B_1, B_2, B_3, \text{ and } B_4\}$, respectively, where $B_x$ represents the new external bid for year x.

The constrained optimization algorithm discussed above can then be applied independently to each of the new bid amounts $B_1, B_2, B_3,$ and $B_4$ to calculate adjusted component bid amounts in respective years 1, 2, 3, and 4. Instead of years, a project under bid, and corresponding bid amounts, can be provided for multiple time periods (e.g., quarters, decades, etc.).

Instructions of software described above (including bid software tool 102 of FIG. 1) are loaded for execution on a processor (such as one or more CPUs 104 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
    receiving, by a tool executed by a computer, an initial external bid of an enterprise based on initial component bids of plural entities, wherein the plural entities are associated with the enterprise, and wherein the initial external bid is an aggregate of the initial component bids;
    receiving, by the tool executed by the computer, margin values representing margins acceptable to the entities;
    receiving, by the tool executed by the computer, a new external bid that is different from the initial external bid; and
    generating, by the tool executed by the computer, adjusted component bids of the plural entities according to the new external bid and the margin values of the entities, wherein the new external bid is an aggregate of the adjusted component bids.

2. The method of claim 1, wherein generating the adjusted component bids is based on a constrained optimization model that defines constraints based on the margins.

3. The method of claim 2, wherein the constrained optimization model further specifies an objective function, wherein generating the adjusted component bids is further based on the objective function.

4. The method of claim 2, wherein generating the adjusted component bids is based on the constrained optimization model that defines constraints based on initial margins associated with corresponding ones of the entities and minimum margins associated with corresponding ones of the entities.

5. The method of claim 1, further comprising defining constraints based on the margin values,
    wherein generating the adjusted component bids is based on the defined constraints.

6. The method of claim 5, further comprising the tool invoking a solver to solve a problem defined at least in part by the constraints, wherein solving the problem comprises generating the adjusted component bids.

7. The method of claim 6, further comprising defining an objective function that contains variables representing the adjusted component bids and the initial component bids, and wherein generating the adjusted component bids is further based on the objective function.

8. The method of claim 6, further comprising defining an objective function that contains variables representing the margin values and the initial bid components, and wherein generating the adjusted component bids is further based on the objective function.

9. A method comprising:
- receiving, by a tool executed by a computer, an initial external bid of an enterprise based on initial component bids of plural entities;
- receiving, by the tool executed by the computer, margin values representing margins acceptable to the entities;
- receiving, by the tool executed by the computer, a new external bid that is different from the initial external bid;
- generating, by the tool executed by the computer, adjusted component bids of the plural entities according to the new external bid and the margin values of the entities;
- defining an objective function for minimizing deviation of the adjusted component bids from a proportional allocation according to a ratio of the new external bid to the initial external bid; and
- defining constraints that account for the margin values,
- wherein generating the adjusted component bids is based on the objective function and the constraints.

10. The method of claim 9, wherein receiving the margin values comprises receiving the margin values representing minimum profit margins acceptable to the plural entities, and wherein the plural entities are part of the enterprise.

11. The method of claim 9, wherein receiving the margin values comprises receiving one of margin percentages and margin monetary amounts.

12. A method of performing bidding using a bidding tool executed in a computer, comprising:
- receiving, by the bidding tool executed in the computer, a revised external bid provided by an enterprise to an external entity, wherein the revised external bid is different from an initial external bid, and wherein the enterprise is associated with plural entities; and
- adjusting, by the bidding tool executed in the computer, component bids provided by the plural entities in response to the revised external bid using a constrained model that factors in margins acceptable to the entities associated with the enterprise, wherein the constrained model further specifies an objective function for minimizing deviation of the adjusted component bids from a proportional allocation according to a ratio of the revised external bid to the initial external bid, and wherein adjusting the component bids is further based on the objective function.

13. The method of claim 12, wherein the constrained model further factors in margins acceptable by sectors of the enterprise, where each sector includes one or plural ones of the entities, and wherein adjusting the component bids is further based on the margins of the sectors.

14. The method of claim 12, wherein receiving the revised external bid and adjusting the component bids are performed in an on-line bidding environment.

15. The method of claim 12, wherein the revised external bid and initial external bid are for a first time period, the method further comprising:
- receiving at least a second revised external bid provided by the enterprise to the external entity, wherein the second revised external bid is different from a second initial external bid, wherein the second revised external bid and the second initial external bid are for a second time period, the revised external bids and initial external bids for the first and second time periods being for a project under bid that lasts plural time periods; and
- adjusting second component bids for the second time period provided by the plural entities in response to the revised second external bid using the constrained model.

16. The method of claim 12, wherein the margins acceptable to the entities comprise profit margins acceptable to the entities.

17. A machine-readable storage medium storing instructions that when executed cause a computer to:
- receive an initial external bid of an enterprise based on initial component bids of plural entities, wherein the plural entities are associated with the enterprise, and wherein the initial external bid is an aggregate of the initial component bids;
- receive margin values representing margins acceptable to the entities;
- receive a new external bid that is different from the initial external bid; and
- generate adjusted component bids of the plural entities according to the new external bid and the margin values of the entities, wherein the new external bid is an aggregate of the adjusted component bids.

18. The machine-readable storage medium of claim 17, wherein receiving the new external bid and the initial external bid comprises receiving the new external bid and the initial external bid submitted to a customer of the enterprise.

19. The method of claim 1, wherein the initial external bid is a sum of the initial component bids, and the new external bid is a sum of the adjusted component bids.

20. The machine-readable storage medium of claim 17, wherein the initial external bid is a sum of the initial component bids, and the new external bid is a sum of the adjusted component bids.

21. A machine-readable storage medium storing instructions that when executed cause a computer to:
- receive an initial external bid of an enterprise based on initial component bids of plural entities, wherein the plural entities are associated with the enterprise, and wherein the initial external bid is an aggregate of the initial component bids;
- receive margin values representing margins acceptable to the entities;
- receive a new external bid that is different from the initial external bid;
- generate adjusted component bids of the plural entities according to the new external bid and the margin values of the entities, wherein the new external bid is an aggregate of the adjusted component bids;
- define an objective function for minimizing deviation of the adjusted component bids from a proportional allocation according to a ratio of the new external bid to the initial external bid; and
- define constraints that account for the margin values,
- wherein generating the adjusted component bids is based on the objective function and the constraints.

* * * * *